(12) United States Patent
Oliveira et al.

(10) Patent No.: US 12,022,385 B2
(45) Date of Patent: Jun. 25, 2024

(54) SYSTEMS AND METHODS FOR MODELING CONTAINER-BASED NETWORK FUNCTIONS

(71) Applicant: Verizon Patent and Licensing Inc., Basking Ridge, NJ (US)

(72) Inventors: Fernando Oliveira, Bristol, NH (US); Hans Raj Nahata, New Providence, NJ (US); Abhishek Kumar, Bangalore (IN); Raquel Morera Sempere, Weehawken, NJ (US)

(73) Assignee: Verizon Patent and Licensing Inc., Rsasking Ridge, NJ (US)

( * ) Notice: Subject to any disclaimer, the term of this patent is extended or adjusted under 35 U.S.C. 154(b) by 362 days.

(21) Appl. No.: 17/555,159

(22) Filed: Dec. 17, 2021

(65) Prior Publication Data
US 2023/0199628 A1 Jun. 22, 2023

(51) Int. Cl.
*H04W 48/18* (2009.01)
*G06F 9/455* (2018.01)
*G06F 9/50* (2006.01)
*H04W 80/06* (2009.01)

(52) U.S. Cl.
CPC ........ *H04W 48/18* (2013.01); *G06F 9/45558* (2013.01); *G06F 9/5077* (2013.01); *H04W 80/06* (2013.01); *G06F 2009/4557* (2013.01); *G06F 2009/45579* (2013.01); *G06F 2009/45595* (2013.01)

(58) Field of Classification Search
CPC ... H04W 48/18; H04W 80/06; G06F 9/45558; G06F 9/5077; G06F 2009/4557; G06F 2009/45579; G06F 2009/45595
See application file for complete search history.

(56) References Cited

U.S. PATENT DOCUMENTS

| | | | |
|---|---|---|---|
| 2021/0389970 A1* | 12/2021 | Geng | H04L 41/0895 |
| 2022/0350637 A1* | 11/2022 | Wu | G06F 9/45558 |
| 2023/0062410 A1* | 3/2023 | Martin de Nicolas | H04L 41/5054 |
| 2023/0067168 A1* | 3/2023 | Sharma | G06F 3/0486 |
| 2023/0342183 A1* | 10/2023 | Xia | H04L 41/40 |

OTHER PUBLICATIONS

Network Functions Virtualisation (NFV) Release 3; Protocols and Data Models; NFV descriptors based on TOSCA specification. ETSI GS NFV-SOL 001 V3.5.6 (Dec. 2021), 441 pages.

* cited by examiner

*Primary Examiner* — Hashim S Bhatti

(57) ABSTRACT

Network devices may be configured to execute computer-executable instructions to instantiate a deployable unit based on the instructions. The instructions may include a virtual network function (VNF) template that includes: a virtualized deployment unit (VDU) template that describes the deployable unit that includes containers; and a connection point template bound to the VDU template. The deployable unit may provide services of a network function in an access network or a core network. The deployable unit may include an interface defined by the connection point template.

20 Claims, 11 Drawing Sheets

FIG. 6A

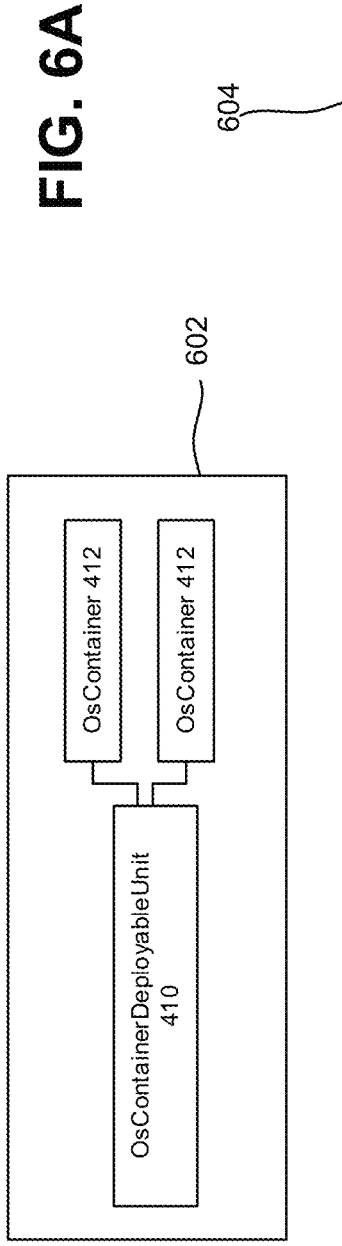

```
1   tosca.nodes.nfv.Vdu.osContainerDeployableUnit:
2     derived_from: tosca.nodes.Root
3     description: | Describes the aggregate of container(s) of a VDU which is a
4       construct  supporting the description of the deployment and operational
5       behavior of a VNF; Corresponds to a Pod in K8S; Can have
6       multiple constitute containers.
7     capabilities:
8       virtual_binding:
9         type: tosca.capabilities.nfv.VirtualBindable
10        occurrences: [ 1, UNBOUNDED ]
11      associable:
12        type: tosca.capabilities.nfv.AssociableVdu
13        occurrences: [ 1, 1 ]
14    requirements:
15      - virtual_storage:
16        capability: tosca.capabilities.nfv.VirtualStorage
17        relationship: tosca.relationships.nfv.AttachesTo
18        occurrences: [ 0, UNBOUNDED ]
19      - container_deployable_unit:
20        capability: tosca.capabilities.nfv.ContainerDeployable
21        relationship: tosca.relationships.nfv.DeploysTo
22        occurrences: [ 1, UNBOUNDED ]
```

FIG. 6B

| Attribute | Type |
|---|---|
| name | String |
| description | String |
| logical_node | map of tosca.datatypes.nfv.LogicalNodeData |
| requested_additional_capabilities | map of tosca.datatypes.nfv.RequestedAdditionalCapability |
| nfvi_constraints | map of String |
| monitoring_parameters | list of tosca.datatypes.nfv.VnfcMonitoringParameter |
| configurable_properties | tosca.datatypes.nfv.VnfcConfigurableProperties |
| vdu_profile | tosca.datatypes.nfv.VduProfile |

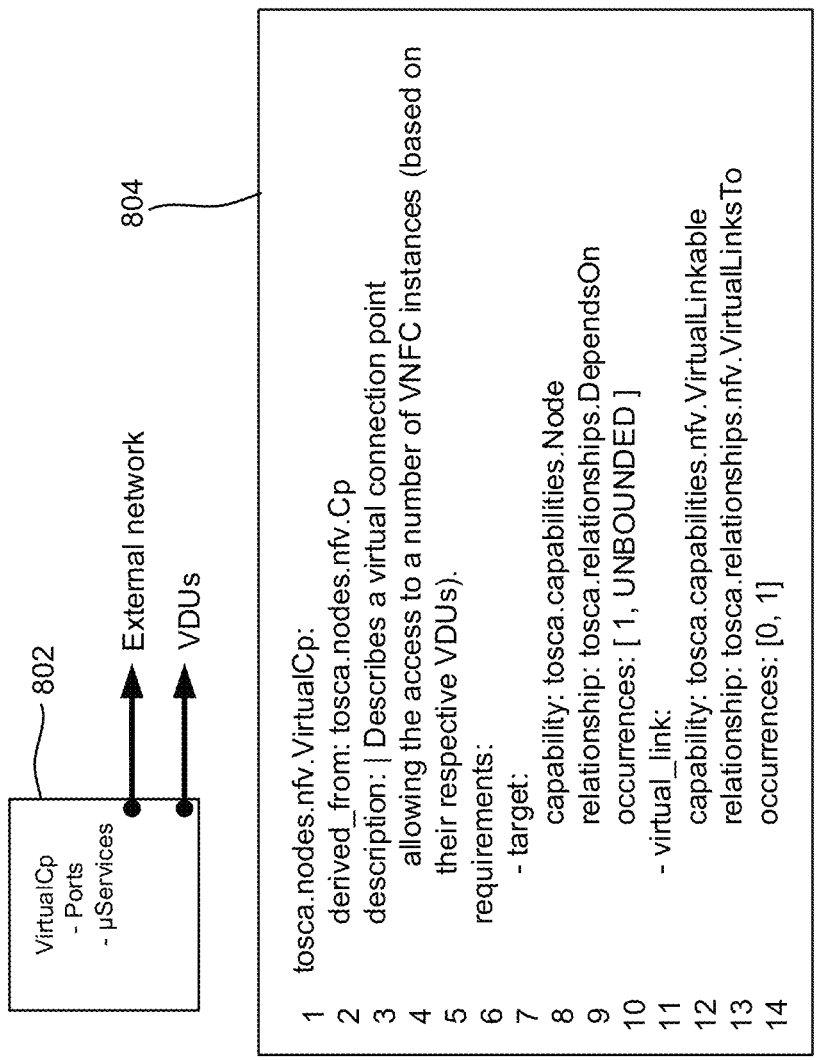

FIG. 9 tosca.datatypes.nfv.ServicePortData:
  derived_from: tosca.datatypes.Root
  description: | describes port
    properties exposed by the VirtualCp

| Attribute | Type |
|---|---|
| name | String |
| protocol | String |
| port | Integer |
| portConfigurable | Boolean |

FIG. 10 tosca.datatypes.nfv.AdditionalServiceData:
  derived_from: tosca.datatypes.Root
  description: | describes the additional service
    data of the VirtualCp used to expose
    properties of the VirtualCp

| Attribute | Type |
|---|---|
| portData | ;ist of tosca.datatypes.nfv.ServicePortData |
| serviceData | String |

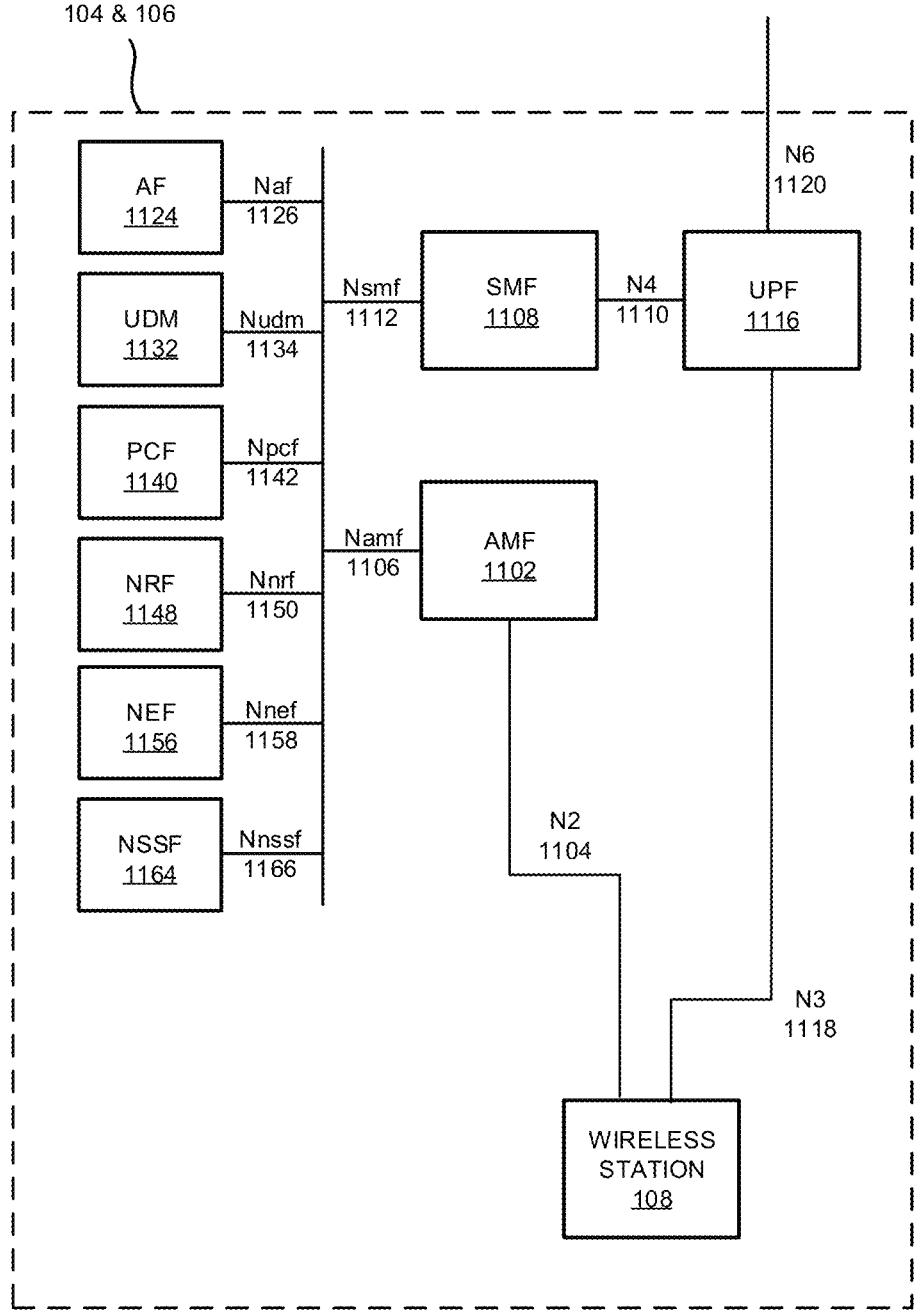

SYSTEMS AND METHODS FOR MODELING CONTAINER-BASED NETWORK FUNCTIONS

BACKGROUND INFORMATION

There are a number of differences between virtual machines and containers. A virtual machine may include hardware, a hypervisor to emulate abstracted versions of the hardware, and an operating system. For virtual machines, hardware is virtualized. In contrast, a container is a program that is run by a container engine, which in turns runs on an operating system. For containers, the operating system is virtualized.

Virtual machines and containers offer different degrees of program isolation. For example, each program that runs on a virtual machine is isolated from another program at the emulated hardware level, although in reality the programs may be running on the same device. In contrast, each program that runs on a container engine is isolated from another container program at the emulated operating system level—each container program executes as if it were on a different operating system, although in reality, the programs may be running on the same operating system.

BRIEF DESCRIPTION OF THE DRAWINGS

FIG. 6A illustrates a diagram and a portion of an example TOSCA document that defines an example Virtualized Deployment Unit (VDU) Operating System (OS) Container Deployable Unit, according to an implementation;

FIG. 6B shows a list of example attributes for the VDU OS Container Deployable Unit, according to one implementation;

FIG. 8 illustrates a diagram of an example virtual Connection Point (CP) and a portion of an example TOSCA document that defines the virtual CP, according to an implementation;

FIG. 9 illustrates a portion of an example TOSCA document that defines ports and a list of example attributes for a port, according to an implementation;

FIG. 10 illustrates a portion of an example TOSCA document that defines services and a list of example attributes for a service, according to an implementation; and FIG. 11 illustrates a portion of an example radio network and an example core network, according to an implementation.

DETAILED DESCRIPTION OF EXAMPLE EMBODIMENTS

The following detailed description refers to the accompanying drawings. The same reference numbers in different drawings may identify the same or similar elements.

The systems and methods described herein relate to container-based modeling of network functions. Today's network automation framework, such as the Open Network Automation Platform (ONAP), focuses on design templates with standard descriptors. The design templates may specify network functions (e.g., a type of network component), their interrelationships, workflows, policies, and lifecycle management processes. Once valid design templates have been created, an orchestrator may parse the design templates and implement the network components specified in the design templates and perform lifecycle management of the components. For the orchestrator, the design template takes the role of computer-executable instructions for performing the lifecycle management of the components.

According to the systems and methods described herein, an orchestrator may construct some of the network components as container-based network functions and other network components as virtual machines. A container-based network function does not require packages that contain code for directly managing hardware since a container runs on the Operating System (OS). Consequently, a container-based network function may use less storage and/or memory, require less time to startup, and be easier to deploy than virtual machine-based network functions. Furthermore, when in operation, container-based network functions may exhibit less latency than virtual machine-based network function. In contrast, a network function that is implemented as a virtual machine can be more isolated and secure, at the emulated machine level than container-based network functions. By implementing and running some network functions as container-based network functions and others as virtual machines, the orchestrator may improve network performance without compromising security.

Figure 1:
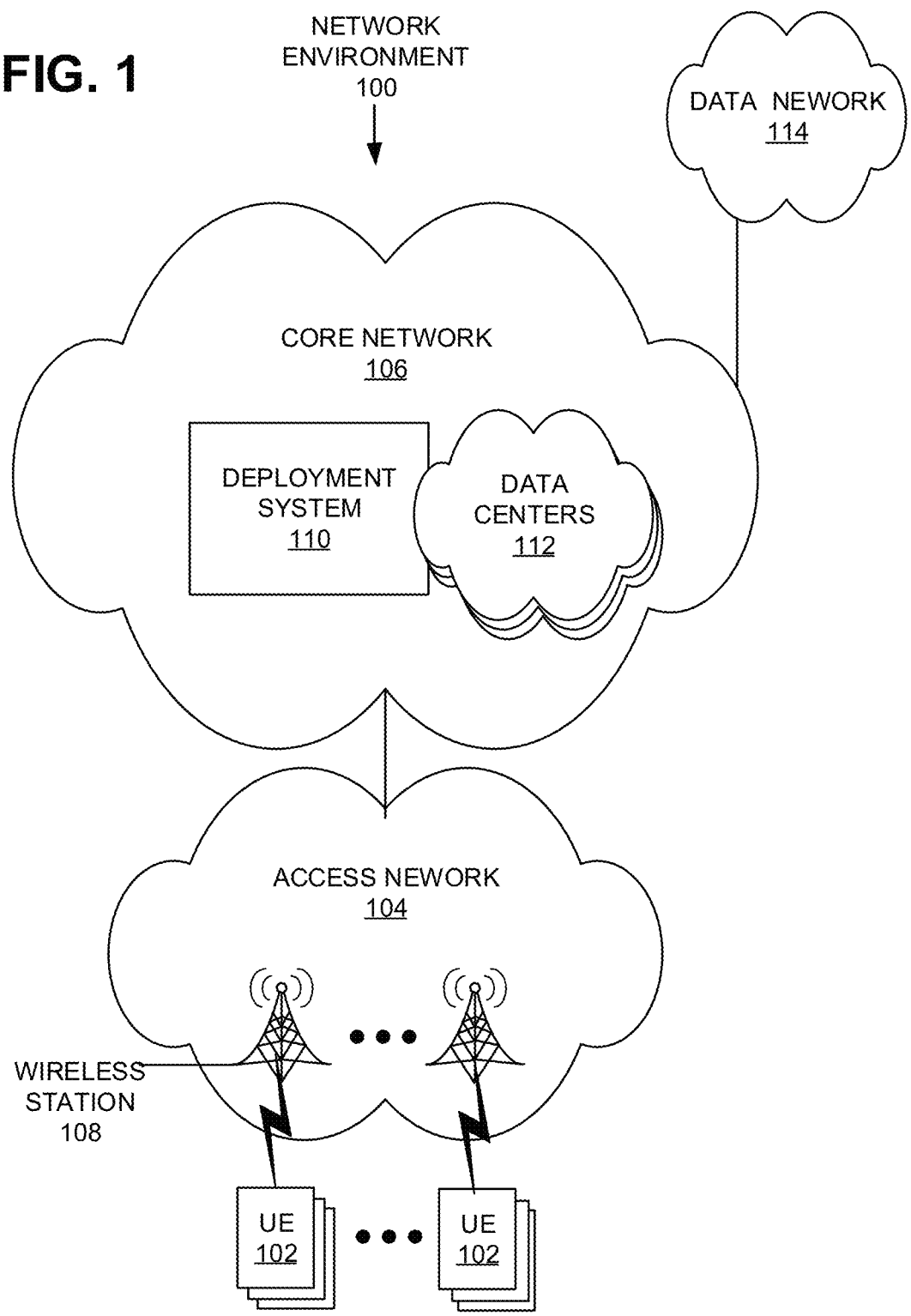
FIG. 1 illustrates an example network environment in which systems and methods described herein may be implemented.

FIG. 1 illustrates an example network environment 100 in which the systems and methods described herein may be implemented. As shown, environment 100 may include User Equipment devices (UEs) 102 (individually and generically referred to as UE 102), an access network 104, a core network 106, and a data network 114. UE 102 may include a wireless communication device, a mobile terminal, or a fixed wireless access (FWA) device. Examples of UE 102 include: a smart phone; a tablet device; a wearable computer device (e.g., a smart watch); a laptop computer; an autonomous vehicle with communication capabilities; a portable gaming system; and an Internet-of-Thing (IoT) device. In some implementations, UE 102 may correspond to a wireless Machine-Type-Communication (MTC) device that communicates with other devices over a machine-to-machine (M2M) interface, such as Long-Term-Evolution for Machines (LTE-M) or Category M1 (CAT-M1) devices and Narrow Band (NB)-IoT devices. UE 102 may send packets to or over access network 104.

Access network 104 may allow UE 102 to access core network 106. To do so, access network 104 may establish and maintain, with participation from UE 102, an over-the-air channel with UE 102; and maintain backhaul channels with core network 106. Access network 104 may convey information through these channels, from UE 102 to core network 106 and vice versa.

Access network 104 may include an LTE radio network, a 5G radio network and/or another advanced radio network.

These radio networks may operate in many different frequency ranges, including millimeter wave (mmWave) frequencies, sub 6 GHz frequencies, and/or other frequencies. Access network 104 may include many wireless stations, Central Units (CUs) and Distributed Units (DUs) and Integrated Access and Backhaul (IAB) nodes. In FIG. 1, only wireless stations 108 are shown. A wireless station 108 may establish and maintain an over-the-air channel with UEs 102 and backhaul channels with core network 106. A wireless station 108 may include an LTE, 5G, or another type of wireless station (e.g., evolved Node B (eNB), next generation Node B (gNB), etc.) that includes one or more Radio Frequency (RF) transceivers. A wireless station 108 that is attached to an IAB node (not shown) via a backhaul link is herein referred to as IAB donor.

Although not shown, access network 104 may include a Multi-Access Edge Computing (MEC) network (also referred to as "MEC cluster" or simply as "MEC"). A MEC may be located geographically close to a wireless station 108 or an IAB node, and therefore also close to UEs 102 serviced by the wireless station 108 or the IAB node. Due to its proximity to UEs 102, a MEC may be capable of providing services to UEs 102 with minimal latency. Depending on the implementations, a MEC may provide many core network functions at network edges. In other implementations, a MEC may be positioned at other locations (e.g., in core network 106) at which the MEC can provide computational resources for improved performance.

Core network 106 may include various types of networks, such as a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, an LTE network (e.g., a 4G network), a 5G network, an ad hoc network, a telephone network (e.g., the Public Switched Telephone Network (PSTN), an intranet, a (Public Land Mobile Network) (PLMN), or a combination of networks. Core network 106 may allow the delivery of Internet Protocol (IP) services to UE 102, and may interface with other networks, such as data network 114.

As shown, core network 106 may include a deployment system 110 and data centers 112. Deployment system 110 may interact with network operators and network designers through client programs (e.g., a browser). Upon receipt of design templates (e.g., computer-executable instructions for deploying network components) from client programs, deployment system 110 may perform tasks for deploying network components (e.g., network functions (NFs)) defined in the templates. Deployment system 110 is described in greater detail below with reference to FIG. 3.

Data centers 112 may include computer devices (e.g., servers) and/or their components (e.g., processors, memories, storage devices, network interfaces, etc.). Although shown as part of core network 106, data centers 112 may also be implemented within data network 114 or a MEC. The devices of data centers 112 may be arranged as part of network function virtualization infrastructure (NFVI) and/or a cloud computing platform. Depending on the implementation, data centers 112 may provide hardware resources for deployment system 112. For example, deployment system 110 may deploy particular network functions in data centers 112. In some embodiments, deployment system 110 itself may be implemented within data centers 112.

Data network 114 may include networks that are external to core network 206. In some implementations, data network 114 may include packet data networks, such as an Internet Protocol (IP) network. Data network 114 may include, for example, IP Multimedia Subsystem (IMS) for providing Voice-over-IP (VoIP) services.

For clarity, FIG. 1 does not show all components that may be included in network environment 100 (e.g., routers, bridges, wireless access points, additional networks, additional UEs 102, wireless stations 108, IAB nodes, etc.). Depending on the implementation, network environment 100 may include additional, fewer, different, or a different arrangement of components than those illustrated in FIG. 1. Furthermore, in different implementations, the configuration of network environment 100 may be different.

Figure 2:
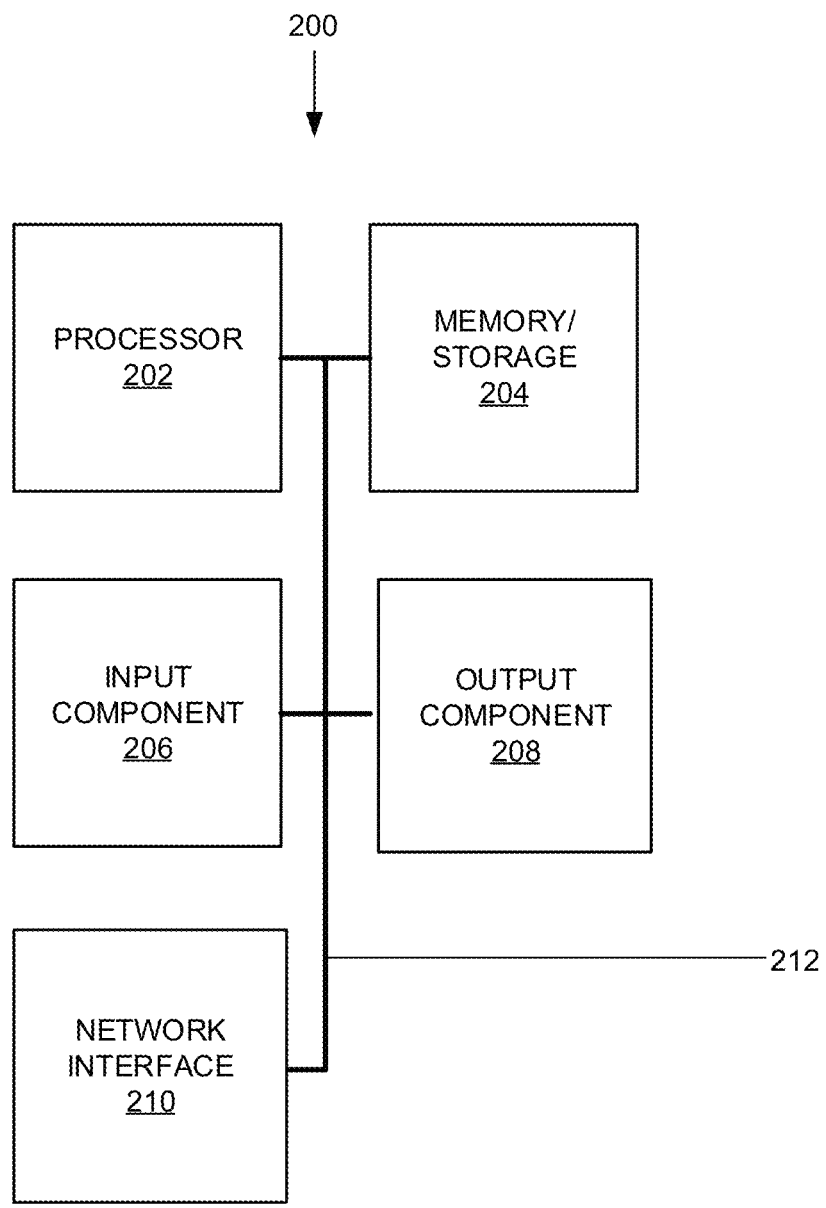
FIG. 2 depicts example functional components of a network device according to an implementation.

FIG. 2 depicts example components of a network device 200. UE 102, access network 104, core network 106, wireless station 108, deployment system 110, data centers 112, data network 114 and/or other elements in network environment 100 (e.g., routers, bridges, gateways, servers, switches, etc.) may include or be implemented by one or more of network device 200. As shown, network device 200 includes a processor 202, memory/storage 204, input component 206, output component 208, network interface 210, and communication path 212. In different implementations, network device 200 may include additional, fewer, different, or a different arrangement of components than the ones illustrated in FIG. 2. For example, network device 200 may include a display, network card, etc.

Processor 202 may include a processor, a microprocessor, an Application Specific Integrated Circuit (ASIC), a Field Programmable Gate Array (FPGA), a programmable logic device, a chipset, an application specific instruction-set processor (ASIP), a system-on-chip (SoC), a central processing unit (CPU) (e.g., one or multiple cores), a microcontrollers, and/or another processing logic device (e.g., embedded device) capable of controlling device 200 and/or executing programs/instructions.

Memory/storage 204 may include static memory, such as read only memory (ROM), and/or dynamic memory, such as random access memory (RAM), or onboard cache, for storing data and machine-readable instructions (e.g., programs, scripts, etc.).

Memory/storage 204 may also include a CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 204 may be external to and/or removable from network device 200. Memory/storage 204 may include, for example, a Universal Serial Bus (USB) memory stick, a dongle, a hard disk, off-line storage, a Blu-Ray® disk (BD), etc. Memory/storage 204 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 206 and output component 208 may provide input and output from/to a user to/from device 200. Input and output components 206 and 208 may include, for example, a display screen, a keyboard, a mouse, a speaker, actuators, sensors, gyroscope, accelerometer, a microphone, a camera, a DVD reader, Universal Serial Bus (USB) lines, and/or other types of components for obtaining, from physical events or phenomena, to and/or from signals that pertain to device 200.

Network interface 210 may include a transceiver (e.g., a transmitter and a receiver) for network device 200 to communicate with other devices and/or systems. For example, via network interface 210, network device 200 may communicate with wireless station 108.

Network interface 210 may include an Ethernet interface to a LAN, and/or an interface/connection for connecting device 200 to other devices (e.g., a Bluetooth interface). For example, network interface 210 may include a wireless modem for modulation and demodulation.

Communication path 212 may enable components of network device 200 to communicate with one another.

Network device 200 may perform the operations described herein in response to processor 202 executing software instructions stored in a non-transitory computer-readable medium, such as memory/storage 204. The software instructions may be read into memory/storage 204 from another computer-readable medium or from another device via network interface 210. The software instructions stored in memory or storage (e.g., memory/storage 204, when executed by processor 202, may cause processor 202 to perform processes that are described herein.

Figure 3:
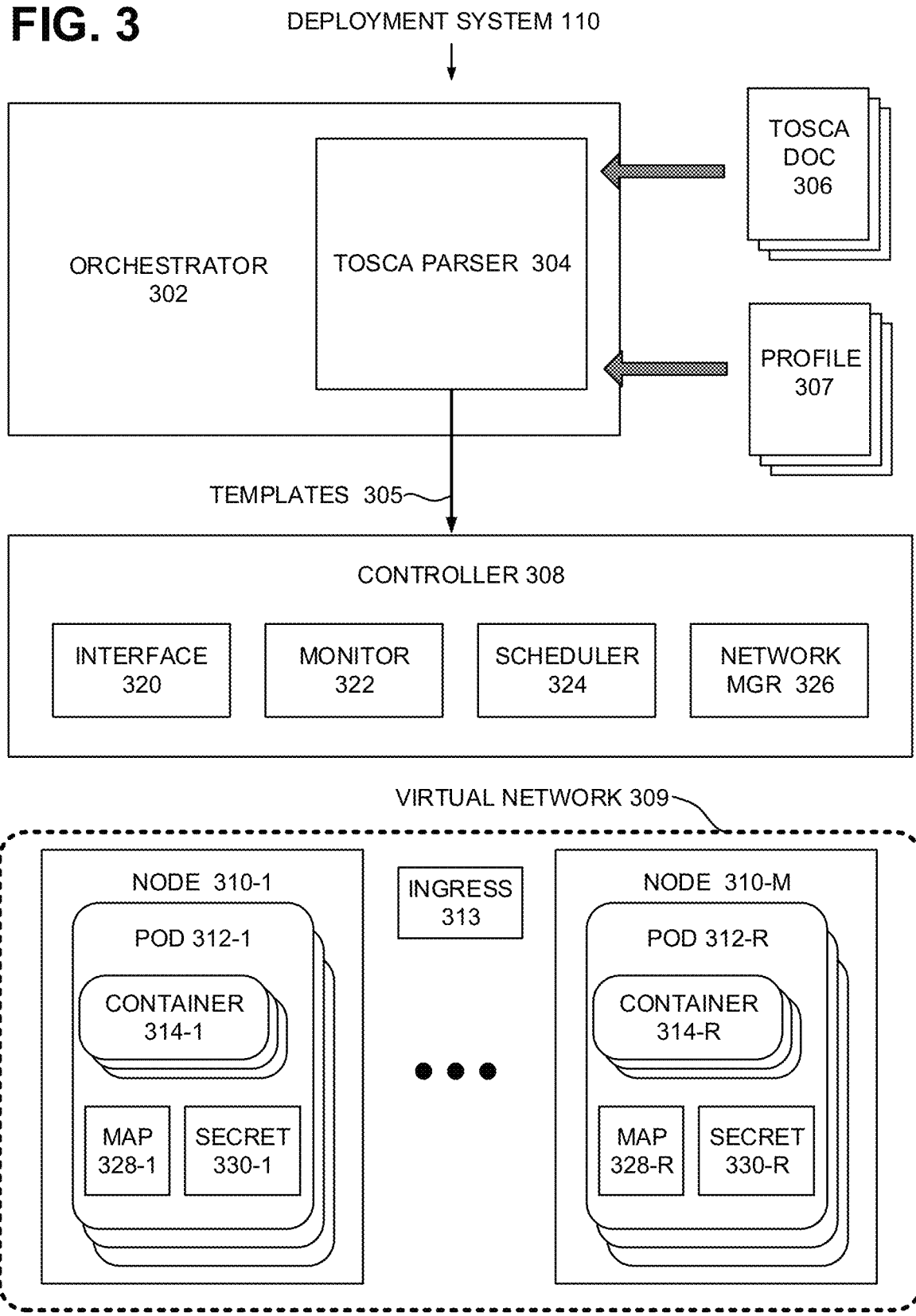
FIG. 3 illustrates a portion of an example deployment system according to an implementation.

FIG. 3 illustrates a portion of an example deployment system 110. As indicated above, deployment system 110 may be implemented as part of a MEC, access network 104, core network 106 (e.g., in data centers 112), or data network 114. According to FIG. 3, deployment system 110 may include an orchestrator 302, a controller 308, and nodes 310-1 through 310-M, wherein M is a positive integer. Depending on the embodiment, deployment system 110 may include additional, fewer, or different, or a different arrangement of components than those depicted in FIG. 3.

Orchestrator 302 may include a Topology and Orchestration Specification for Cloud Application (TOSCA) parser 304. Depending on the implementation, orchestrator 302 may include additional components. TOSCA parser 304 may parse TOSCA documents 306, validate TOSCA documents 306, and generate normalized templates 305. Furthermore, parser 304 may use the normalized templates to produce a service topology. After generating the normalized templates 305 and the service topology, orchestrator 302 may pass the templates 305 and the topology to a controller 308, to be described below.

The production process for generating the template 305 and/or topology may include executing platform-specific substitution directives (e.g., substitute parts of TOSCA document 306 with mappings for Kubernetes link requirements) and resolving various requirements in accordance with profiles 307. Profiles 307 may inform TOSCA parser 304 of resources (e.g., compute nodes, etc.). Profiles 307 may have been created by a network operator or a system that has knowledge of the TOSCA syntax/semantics and knowledge of the system underlying orchestrator 302.

TOSCA document 306 may include instructions for orchestrator 302 and controller 308 to perform the lifecycle management of VNFs. A TOSCA document 306 may include one or more templates that define workflow, logical network elements, policies, etc. For example, TOSCA document 306 may include a service template that describes cloud workloads and provides the topology map, which is a graph of node templates that model network components. TOSCA document 306 may also include a node template which, in turn, may comprise other node templates and relationship templates that model the relationship between the templates. When generating a workflow for the service, for example, orchestrator 302 may rely on the relationship, specified in the templates, between the node templates to determine the order of node instantiation. Therefore, if an application requires a database, for example, orchestrator 302 may instantiate and configure a database prior to instantiating and configuring the application.

Each element specified in a TOSCA document 306 may belong to a type (e.g., a base type or a defined/derived type). For example, each node in a TOSCA template may belong to a node type (e.g., compute node type, a network node type, a database node type, etc.), and a relationship may belong to a relationship type.

Controller 308 (also referred to herein as a domain-specific orchestrator) may receive network templates 305 from orchestrator 302 and use the received templates 305 to manage applications and/or devices. For example, controller 308 may generate a deployment plan and deploy an application in accordance with the plan on a platform based on the service topology. The platform may comprise physical devices, virtual machines, operating systems, a network, a cloud, etc. Domain-specific orchestrator 308 may manage container-based applications and/or non-container based applications.

When implemented as a container orchestrator, domain-specific orchestrator 308 may run on a network node that functions as the master for tasks or processes that implement the applications at other network nodes. In such an implementation, domain specific orchestrator 308 may include: an Application Programming Interface (API) server 320, a monitor 322; a scheduler 324; and a network manager 326.

Interface 320 may allow controller 308 to interact with orchestrator 302 or external network elements (e.g., a client program for instructing controller 308). An example client program may include a graphical user interface program or a console. Monitor 322 may track services that run on the network (e.g., network 309) managed by orchestrator 308. For example, monitor 322 may track which application on network 309 is up, which one is starting, latencies associated with each service, traffic volume for each service, and other performance parameters (e.g., memory usage, CPU usage, etc. Scheduler 324 may schedule the start and/or the end of each service at different network elements in virtual network 309. The network elements ay include, for example, components on nodes 310 (e.g., pods 312, containers 314, etc.). Network manager 326 may set up and maintain the virtual network 309, which comprises network nodes 310-1 through 310-M (herein collectively referred to as nodes 310 or generically as node 310).

Nodes 310 may each include a virtual machine, a bare metal node, a software component, an operating system, or another component that is capable of functioning as a network element. For a container-based platform, nodes 310 may form a virtual network 309 (which may be maintained by network manager 326), where at least one of the nodes 310 is a master node 310 that hosts controller 308. Other nodes 310 may include worker nodes 310 that host the applications.

In some embodiments (e.g., an embodiment that include containers), a node 310 may include one or more pods 312. Each pod is the smallest unit of virtual network element that can have an IP address or be coupled with another element (herein also called a service, which can represent a set of pods 312 with the same function) that has an IP address. Although pods 312 of the virtual network may communicate with one another via the services, a network element that is external to the platform can access pods 312 through a network component that is referred to as an ingress. An ingress 313, as used herein, may refer to an interface object that manages external access to the services (where each service is supported by a set of pods 312) in a cluster, though hypertext transfer protocol (HTTP or HTTPS) An ingress 313 may provide load balancing, a session termination, and a virtual hosting.

For flexibility in maintenance and operation of components, each of which may require different levels of security, each pod 312 is associated with a configuration map 328 and a secret 330, which is a repository of encrypted information (e.g., a password to a database). Pod 312 may obtain configuration parameters from its configuration map 328, and obtain credentials (or other information that needs to be secure) from the secret 330. For high availability, pods 312 recognize storage elements (herein referred to as volumes), to which pods 312 may store data for persistence.

As further shown, each pod 312 may include one or more containers 314. Each container 314 may include a complete set of code and environment settings for execution by a container engine that runs on top of an operating system. An application and all its dependencies can be collected into a single file and made into a container 312.

Figure 4:
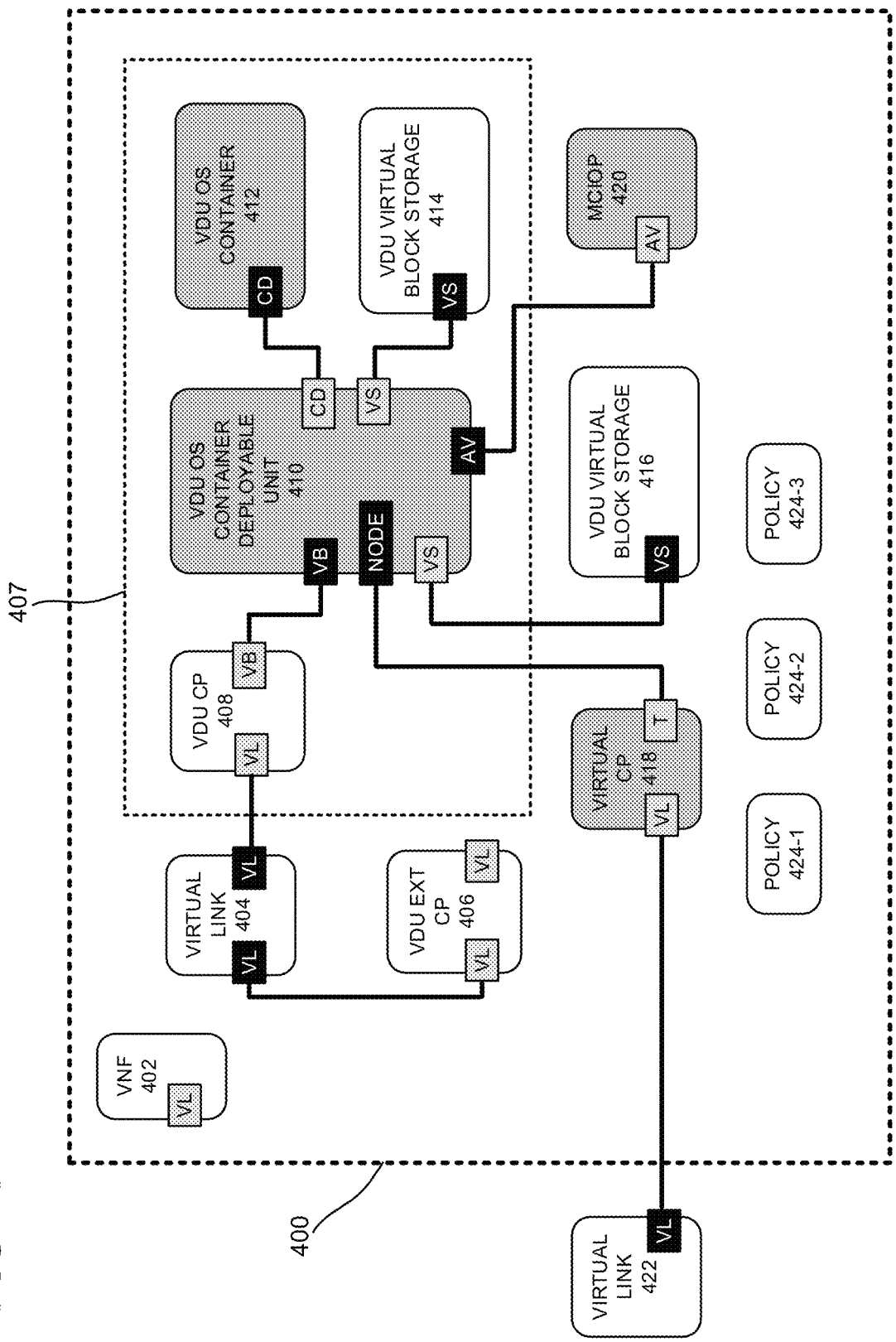
FIG. 4 depicts an example Topology and Orchestration Specification for Cloud Application (TOSCA) template for a Virtual Network Function (VNF), according to an implementation.

FIG. 4 depicts a TOSCA template 400 for a virtual network function (VNF) according to an implementation. Template 400 shows the topology of other TOSCA templates 402-424. Orchestrator 302 and/or controller 308 may process these templates to instantiate and manage logical network components that are defined by the templates. Depending on the context, the terms for the templates and the terms for the corresponding logical network nodes (that may be instantiated by orchestrator 302 and/or controller 308 by processing TOSCA documents 306) may be used interchangeably. According to template 400, a VNF 402 may include a virtual link (VL) 404, VNF EXT (external) CP (connection point) 406, a Virtualized Deployment Unit (VDU) 407, a VDU Virtual Block Storage 416, a virtual CP 418, an Managed Container Infrastructure Object Package (MCIOP) 420, and policies 424-1 through 424-3. Components 418 and 420 are associated containers. VL 422 which is external to VNF 402 is described below along with VL 404. Depending on the implementation, VNF 402 may include additional, fewer, different, and/or a different arrangement of components than those illustrated in FIG. 4.

Each of VL 404 and 422 represents a logical connection between at least two logical linkable network components, each of which has the ability to connect to another logical linkable network component. As part of a TOSCA template, a virtual link describes basic elements common to connections and required parameters, such as bandwidth, Quality-of-Service (QoS) class, etc. Examples of virtual link types include connections/links within a virtual private network (VPN), virtual Local Area Networks (VLANs), Multi-Protocol Label Switching (MPLS) networks, etc.

In FIG. 4, VL 404 connects to or links to virtual connection points—VDU CP 408 and VDU EXT CP 406 (to be described below), meaning that as a TOSCA object, VL 404 stores references (e.g., addresses or indices) to the connection points. The references stored in VL 404 and/or 422 is used during the instantiation of or during operation of VNF 402, to provide information for allowing processing to take place through the connection points. For example, if a message arrives at VDU CP EXT 406, the system processes the message for and/or directs the message to VDU CP 408 based on the information given by VL 404. In FIG. 4, VL 404 is illustrated as having two black squares (labeled VL) from which line connections are made to the connection points 406 and 408, indicating that VL 404 includes information about linkable logical points. Similarly, VL 422 is a virtual link between virtual CP 418 and another (not shown) connection point external to VNF 402 and may include information related to virtual CP 418 and the external point.

VNF EXT CP 406 exposes an internal connection point within a VDU 407, to another logical connection point outside of VDU 407. As shown in FIG. 4, VNF EXT CP 406 is connected to a connection point within VDU 407 (i.e., VDU CP 408). Indicating that, to an object external to VDU 407, VDU CP 406 is the proxy for VDU CP 408. Each connection point, external or internal to VDU 407, represents a physical or virtual interfaces of nodes (e.g., VDU 407), their properties, and metadata associated with the interfaces. Each connection point is required to be virtually bindable and/or virtually linkable.

VDU 407 may define a basic unit of virtualization. In the implementation shown, VDU 407 includes a VDU CP 408, VDU Operating System (OS) Container Deployable Unit 410, a VDU OS container 412, and a virtual VDU block storage 414. Components 410 and 412 are associated with containers. VDU CP 408 includes at least two requirements—the virtual bindable (VB) and the virtual linkable (VL). The VB block of VDU CP 408 represents a bindable aspect of VDU OS Container Deployable Unit 410.

VDU OS Container Deployable Unit 410 describes a deployment unit of a container system. When template 400 is processed by orchestrator 302 and controller 308 to generate virtual network components in a container environment (e.g., Kubernetes environment), unit 410 would correspond to pod 312. In template 400, unit 410 may describe, for example, scaling, monitoring parameters, configurable parameters, persistent storage, and constituent containers of the deployment unit, such as applications. For example, as shown, the VDU OS Container Deployable Unit 410 includes deployable containers (CDs) depicted as VDU OS Container 412. In another example, VDU OS Container Deployable Unit 410 describes two persistent storages—VDU virtual block storages 414 and 416. As shown, storage 414 is within VDU 407, whereas storage 416 is external to VDU 407 but still within VNF 402. This would indicate, if VDU 407 was implemented on a Kubernetes cluster, the topology of the corresponding storages and the pods to which unit 410 corresponds.

Virtual CP 418 may describe services, which may include a micro-service. As described above, each service may represent a group of pods 312 (or VDU OS Container Deployable Units 410) that provide the same function (a service). Virtual CP 418 may identify or describe addresses, protocols, and thus may be associated with an IP address for the units 410.

MCIOP 420 may describe artifacts (e.g., an image of software). MCIOP 420 is described below in greater detail. Virtual link 422 may describe a connection between virtual CP 418 in VNF 402 and a component external to VNF 402. Policies 424-1 through 424-3 may include rules that pertain to scaling, affinity, and security (e.g., policies of different types). Each policy may be defined to have targets (e.g., nodes or groups to which the policy applies), triggers (e.g., conditions that trigger the particular policy), properties, etc. For example, a scaling policy may be triggered when a service receives more than a particular number of service requests per second from external network elements (e.g., UEs 102). When the scaling trigger condition is met, controller 308 may instantiate unit 410 (e.g., more pods that correspond to unit 410).

Figure 5:
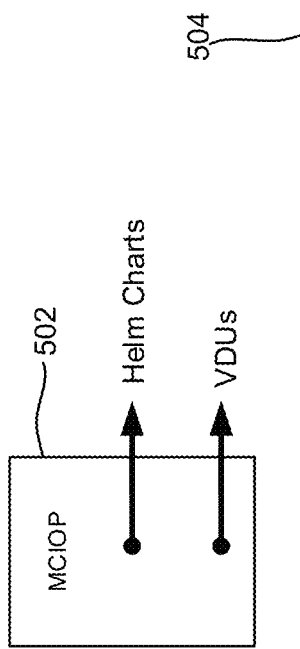
FIG. 5 illustrates a diagram of an example Managed Container Infrastructure Object Package (MCIOP) and a portion of an example TOSCA document that defines the MCIOP, according to an implementation.

FIG. 5 illustrates a diagram 502 of MCIOP 420 and a portion 504 of a TOSCA document 306 that defines the MCIOP 420, according to an implementation. Diagram 502 summarizes features of MCIOP 420. In particular, diagram 502 indicates that MCIOP 420 includes information (herein referred to as a map node templates (e.g., Helm node templates) about a set pf files and/or directories (e.g., as a tar file, Helm charts, etc.) for VDUs. As an example, a map node template may represent a Helm chart that may exist in a Kubernetes cluster. In this example, when a set of preconditions are met, controller 308 may employ a program known as Helm (e.g., an application implemented in Kubernetes cluster) to install the Helm charts, which correspond to the map node templates in MCIOP 420, in the Kubernetes cluster. Installing the Helm charts in effect installs pods corresponding to VDUs and other containers in the pods (e.g., VDU OS Container). The information about each VDUs refers to a particular pod (i.e., Virtual Network Function container-based (VNFC)) that is affected by installation of the Helm charts. Although not shown, MCIOP 420 also includes information about the order in which the Helm charts are to be installed.

Portion 504 defines MCIOP 420 and provides information about MCIOP 420. For example, portion 504 indicates: MCIOP 420 is derived from tosca.Nodes.Root (e.g., a TOSCA node type); MCIOP 420 represents the object described by an MCIOP artifact; and MCIOP 420 has a number of requirements, including VDUs as described above with reference to diagram 502. MCIOP 420 requires each of the VDUs to have a certain capability and relationship to MCIOP 420 and to be of the type VDU OS Container Deployable Unit. As shown, the number of VDUs may be "unbounded," indicating that the number is greater than zero but is otherwise not specified.

FIG. 6A illustrates a diagram 602 and a portion 604 of a TOSCA document 306 that defines VDU OS Container Deployable Unit 410. Diagram 602 summarizes features of VDU OS Container Deployable Unit 410. As shown, VDU OS Container Deployable Unit 410 includes VDU OS Containers 412. Portion 604 defines VDU OS Container Deployable Unit 410. For example, portion 604 indicates that VDU OS Container Deployable Unit 410, when instantiated through orchestrator 302 and controller 308, corresponds to a pod 312 in a Kubernetes cluster and can include multiple containers. Portion 604 also indicates that VDU OS Container Deployable Unit 410 is bindable and associable. VDU OS Container Deployable Unit 410 is required to have components that would correspond to virtual storages (e.g., VDU block storage) and containers (e.g., an OS Container).

FIG. 6B shows a list of attributes for VDU OS Container Deployable Unit 410, according to one implementation. The list of attributes are typically provided in a TOSCA document 306. As shown, the attributes include: a name, a description, a logical node, requested additional node capabilities, NFVI constraints, monitoring parameters, configurable properties, and a VDU profile. The name and description pertain to the name and the description for VDU OS Container Deployable Unit 410. The requested additional node capabilities refer to a map of capabilities (defined in TOSCA docs) that pertain to VDU OS Container Deployable Unit 410 (e.g., capabilities in addition to bindable or associable). The NFVI constraints refer to a map of specific constraints on network functions. The monitoring parameters specify operational parameters which are to be monitored when the virtual network component corresponding to Unit 410 is instantiated and is in operation. The configurable properties may refer to configurable properties of the set of VNF containers (e.g., properties associated with pod 312). The VDU profile may include information needed to generate descriptors or templates for implementing VDU OS Container Deployable Unit 410 on nodes 310.

Figure 7:
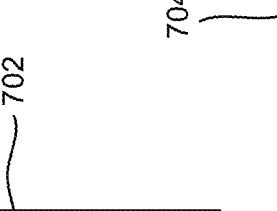
FIG. 7 illustrates a portion of an example TOSCA document that defines a VDU OS Container and a list of example attributes for the VDU OS Container, according to an implementation.

FIG. 7 illustrates a portion 702 of a TOSCA document 306 that defines VDU OS Container 412 and a list of attributes 704 for VDU OS Container 412, according to an implementation. As shown, portion 702 indicates that VDU OS Container 412 may correspond to, when instantiated via orchestrator 302 and controller 308, a container. List of attributes 704 include the name, the description of VDU OS Container 412, and parameters associated with the computational capability of the container, such as: requested number or amount of CPUs, memories, storage; and limits (e.g., an upper or a lower bound) on the number of CPUs, memories, and storage.

FIG. 8 illustrates a diagram 802 of virtual CP 418 and a portion 804 of a TOSCA document 306 that defines virtual CP 418, according to an implementation. Diagram 802 summarizes features of virtual CP 418. In particular, diagram 802 indicates virtual CP 418 includes information about ports and micro-services or services. As explained above, a service represents one or more components that correspond to instantiated VDUs. The ports and services are described in greater detail below. Portion 804 defines virtual CP 418 and provides information about virtual CP 418. For example, portion 804 indicates: virtual CP 418 is derived from tosca.Nodes.nfv.Cp (e.g., a TOSCA node type); virtual CP 418 allows access to groups of VNF containers (VNFCs), where each group corresponds to a VDU. As also shown, virtual CP 418 is required to be linkable to a node and have a target node—to be linked to virtual CP 418.

FIG. 9 illustrates a portion 902 of a TOSCA document that defines ports shown in diagram 802 of FIG. 8 and a list of attributes 904 for a port, according to an implementation. As shown, portion 902 indicates that each of the ports in diagram 802 of FIG. 8 describes a port defined in a TOSCA template. List of attributes 902 indicates a name of the port, a protocol associated with the port, a port number, and whether the port is configurable.

FIG. 10 illustrates a portion 1002 of a TOSCA document that defines micro-services (or services) shown in diagram 802 of FIG. 8 and a list of attributes 1004 for a service, according to an implementation. Portion 1002 describes each of the micro-services in diagram 802 and indicates that each service is exposed through virtual CP 418. List of attributes 1004 provide information regarding the services themselves (as defined in related TOSCA templates) and ports that are associated with the services.

FIG. 11 illustrates example a portion 1100 of radio network 104 and core network 106 of FIG. 1. As shown, portion 1100 may include a number of network functions, which include Access and Mobility Function (AMF) 1102, a Session Management Function (SMF) 1108, a User Plane Function (UPF) 1116, an Application Function (AF) 1124, a Unified Data Management (UDM) 1132, a Policy Control Function (PCF) 1140, a Network Repository Function (NRF) 1148, a Network Exposure Function (NEF) 1156, a Network Slice Selection Function (NSSF) 1164, and a wireless station 108. Elements 1102-1164 may be included in core network 106, and wireless station 108 may be included in access network 104.

Each of network functions 1102-1164 within portion 1100 may be implemented through network function virtualization or as container-based network function. For example, for each of network functions 1102-1164, a network operator may create TOSCA documents or templates in which VDUs that correspond to network functions 1102-1164 are defined. Orchestrator 302 and controller 308 may then perform lifecycle management for the VDUs based on the TOSCA documents. For example, orchestrator 302 and controller 308 may create network functions 1102-1164 as virtual machines, services (comprising pods 312) and containers, etc., in accordance with TOSCA document 306. That is, each of the network functions 1102-1164 can be a virtual network function corresponding to a VDU, such as VDU 407, or another type of virtualized network function.

AMF 1102 may perform registration management, connection management, reachability management, mobility management, and/or lawful intercepts. SMF 1108 to perform session management, session modification. AMF 1102 may communicate with wireless station 108 via an N2 interface 1104; and network components may communicate with AMF 1102 over an Namf interface 1106. SMF 1108 may perform: session creation, session release, IP address allocation and management, Dynamic Host Configuration Protocol (DHCP) functions, and selection and control of UPF 1116. SMF 1108 may communicate with UPF 1116 via an N4 interface 1110; and network components may communicate with SMF 1108 over Nsmf interface 1112.

UPF 1116 may serve as a gateway to a packet data network, act as an anchor point, perform packet inspection, routing, and forwarding, perform QoS handling in the user plane, uplink traffic verification, transport level packet marking, downlink packet buffering, and/or other type of user plane functions. UPF 1116 may communicate with wireless station 108 and other network components over N3 interface 1118 and N6 interface 1120, respectively.

AF 1124 may provide services associated with a particular application. UDM 1132 may manage subscription information, handle user identification and authentication, and perform access authorization. PCF 1140 may support policies to control network behavior, provide policy rules to control plane functions, access subscription information relevant to policy decisions, and perform policy decisions. NRF 1148 may support service discovery, registration of network function instances, and maintain profiles of available network function instances. NEF 1156 may expose capabilities and events to other network functions, including third party network functions. NSSF 1164 may select a network slice instance to serve a particular UE 102.

Network components may interact with AF 1124, UDM 1132, PCF 1140, NRF 1148, NEF 1156, and NSSF 1164 through their respective interfaces: Naf 1126, Npcf 1142, Nnrf 1150, Nnef 1158, and Nnssf 1166. For virtualization and/or containerization, TOSCA documents (e.g., TOSCA documents 306) may define data types corresponding to the interfaces for components 1102-1164. When instantiated, a logical component corresponding to virtual CP 418 may implement the particular interface for the VNF created based on the VDU 407 attached to the virtual CP 418.

For example, assume that a particular VDU 407 describes a container-based AMF 1102. Such a VDU 407 would be connected to a virtual CP 418 that refers to Namf 1106. During the instantiation of the VNF, virtual CP 418 (or a corresponding network template for virtual CP 418) would provide information to implement the interface Namf 1106 for the container-based AMF 1102.

Depending on the implementation, portion 1100 may include additional, fewer, or different components than those illustrated in FIG. 11. For example, portion 1100 may include Authentication Server Function (AUSF), a Central Unit (CU)-Control Plane (CU-CP), CU-User Plane (CU-UP), Charging Function (CHF), etc. Such components may be described or defined through TOSCA documents or templates. Orchestrator 302 and controller 308 may implement the corresponding virtual network function or a container-based network function by parsing the TOSCA documents and by instantiating the components described therein.

In this specification, various preferred embodiments have been described with reference to the accompanying drawings. Modifications may be made thereto, and additional embodiments may be implemented, without departing from the broader scope of the invention as set forth in the claims that follow. The specification and drawings are accordingly to be regarded in an illustrative rather than restrictive sense.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A non-transitory computer readable storage medium comprising computer-executable instructions, wherein the instructions include:
   a virtual network function (VNF) template that includes:
      a virtualized deployment unit (VDU) template that describes a deployable unit that includes containers; and
      a connection point template bound to the VDU template,
   wherein when a deployment system executes the instructions, the deployment system instantiates the deployable unit, wherein the deployable unit provides services of a network function in an access network or a core network, and wherein the deployable unit includes an interface defined by the connection point template.

2. The non-transitory computer-readable medium of claim 1, wherein the VNF template includes a Topology and Orchestration Specification for Cloud Application (TOSCA) template, and the deployment system includes one or more orchestrators for instantiating the deployable unit.

3. The non-transitory computer readable medium of claim 1, wherein the deployable unit includes a pod in a Kubernetes cluster.

4. The non-transitory computer-readable medium of claim 1, wherein the VDU template requires one or more virtual block storage templates and one or more container templates, wherein when the deployment system instantiates the deployable unit, the deployment system installs the containers on the deployable unit and provides the deployable unit with access to storage devices that correspond to the virtual block storage templates.

5. The non-transitory computer-readable medium of claim 1, wherein the network function includes one of:
an Access and Mobility Function (AMF);
a Policy Control Function (PCF);
a User Plane Function (UPF);
a Session Management Function (SMF); or
a Unified Data Management (UDM).

6. The non-transitory computer-readable medium of claim 1, wherein the VDU template specifies a target node template, wherein the target node template includes a virtual connection point template that specifies an interface for communicating with one or more deployable units, wherein the one or more deployable units include the deployable unit.

7. The non-transitory computer-readable medium of claim 6, wherein the virtual connection point template comprises a port description that includes a port number and specifies a protocol for a port.

8. The non-transitory computer-readable medium of claim 1, wherein the connection point template is linked to an external connection point template, and wherein the deployment system exposes the deployable unit to another network function in accordance with the connection point template and the external connection point template.

9. The non-transitory computer-readable medium of claim 1, wherein the VNF template further comprises policy templates, wherein the policy templates define at least one of: a scaling policy or a security policy, and wherein each of the policy templates specifies a set of conditions for triggering a policy and identifies nodes to which the policy is to be applied when the conditions are met.

10. The non-transitory computer-readable medium of claim 1, wherein the VDU template is associated with a template that includes information related to Helm charts for VDUs.

11. One or more network devices comprising one or more processors configured to instantiate a deployable unit based on a set of instructions, wherein the instructions include:
a virtual network function (VNF) template that includes:
a virtualized deployment unit (VDU) template that describes the deployable unit that includes containers; and
a connection point template bound to the VDU template,
wherein the deployable unit provides services of a network function in an access network or a core network, and wherein the deployable unit includes an interface defined by the connection point template.

12. The one or more network devices of claim 11, wherein the VNF template includes a Topology and Orchestration Specification for Cloud Application (TOSCA) template, and the one or more network devices include one or more orchestrators for instantiating the deployable unit.

13. The one or more network devices of claim 11, wherein the deployable unit includes a pod in a Kubernetes cluster.

14. The one or more network devices of claim 11, wherein the VDU template requires one or more virtual block storage templates and one or more container templates, wherein when the one or more network devices instantiate the deployable unit, the one or more network devices install the containers on the deployable unit and provide the deployable unit with access to storage devices that correspond to the virtual block storage templates.

15. The one or more network devices of claim 11, wherein the network function includes one of:
an Access and Mobility Function (AMF);
a Policy Control Function (PCF);
a User Plane Function (UPF);
a Session Management Function (SMF); or
a Unified Data Management (UDM).

16. The one or more network devices of claim 11, wherein the VDU template specifies a target node template, wherein the target node template includes a virtual connection point template that specifies an interface for communicating with one or more deployable units, wherein the one or more deployable units include the deployable unit.

17. The one or more network devices of claim 16, wherein the virtual connection point template comprises a port description that includes a port number and specifies a protocol for a port.

18. The one or more network devices of claim 11, wherein the connection point template is linked to an external connection point template, and wherein the one or more network devices expose the deployable unit to another network function in accordance with the connection point template and the external connection point template.

19. The one or more network devices of claim 11, wherein the VNF template further comprises policy templates, wherein the policy templates define at least one of: a scaling policy or a security policy, and wherein each of the policy templates specifies a set of conditions for triggering a policy and identifies nodes to which the policy is to be applied when the conditions are met.

20. The one or more network devices of claim 11, wherein the VDU template is associated with a template that includes information related to Helm charts for VDUs.

* * * * *